(12) United States Patent
Munk-Hansen

(10) Patent No.: US 11,293,412 B2
(45) Date of Patent: Apr. 5, 2022

(54) BUSBAR ARRANGEMENT FOR WIND TURBINE GENERATOR

(71) Applicant: Siemens Gamesa Renewable Energy A/S, Brande (DK)

(72) Inventor: Thorkil Munk-Hansen, Fredericia (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/038,010

(22) Filed: Sep. 30, 2020

(65) Prior Publication Data

US 2021/0102529 A1 Apr. 8, 2021

(30) Foreign Application Priority Data

Oct. 2, 2019 (EP) .................................... 19200994

(51) Int. Cl.
*F03D 80/80* (2016.01)
*F03D 9/25* (2016.01)

(52) U.S. Cl.
CPC ............... *F03D 80/82* (2016.05); *F03D 9/25* (2016.05); *F05B 2220/705* (2020.08); *F05B 2220/706* (2013.01); *F05B 2240/85* (2020.08); *F05B 2250/12* (2013.01); *F05B 2260/301* (2013.01)

(58) Field of Classification Search
CPC ........ F03D 80/82; F03D 9/25; F05B 2240/85; F05B 2220/706; F05B 2250/12; F05B 2260/301; H02G 5/02; H02G 5/00; H02K 7/1838

USPC ..................................................... 290/44, 55
See application file for complete search history.

(56) References Cited

U.S. PATENT DOCUMENTS

| | | | |
|---|---|---|---|
| 8,847,458 B2 | 9/2014 | Le Besnerais | |
| 8,860,238 B2* | 10/2014 | Wiechers | F03D 80/50 290/44 |
| 9,917,483 B2* | 3/2018 | Houzumi | H02K 3/04 |
| 2011/0140446 A1* | 6/2011 | Knoop | F03D 80/85 290/55 |
| 2013/0049501 A1* | 2/2013 | Fujisaki | H02K 3/522 310/71 |
| 2014/0084590 A1 | 3/2014 | Rhinefrank et al. | |

FOREIGN PATENT DOCUMENTS

CN 208723499 U 4/2019

OTHER PUBLICATIONS

European Search Report dated Mar. 17, 2020 for Application No. 19200994.2.

* cited by examiner

*Primary Examiner* — Charles Reid, Jr.
(74) *Attorney, Agent, or Firm* — Schmeiser, Olsen & Watts LLP

(57) ABSTRACT

Provided is a busbar arrangement for a wind turbine generator, the wind turbine generator including a stator and a rotor arranged to rotate around an axis. The busbar arrangement includes a plurality of busbars for transporting electric power away from the generator, wherein each busbar is arranged at an individual radial distance from the axis and at an individual axial position along the axis. Furthermore, a wind turbine and a method of manufacturing a busbar arrangement is provided.

13 Claims, 5 Drawing Sheets

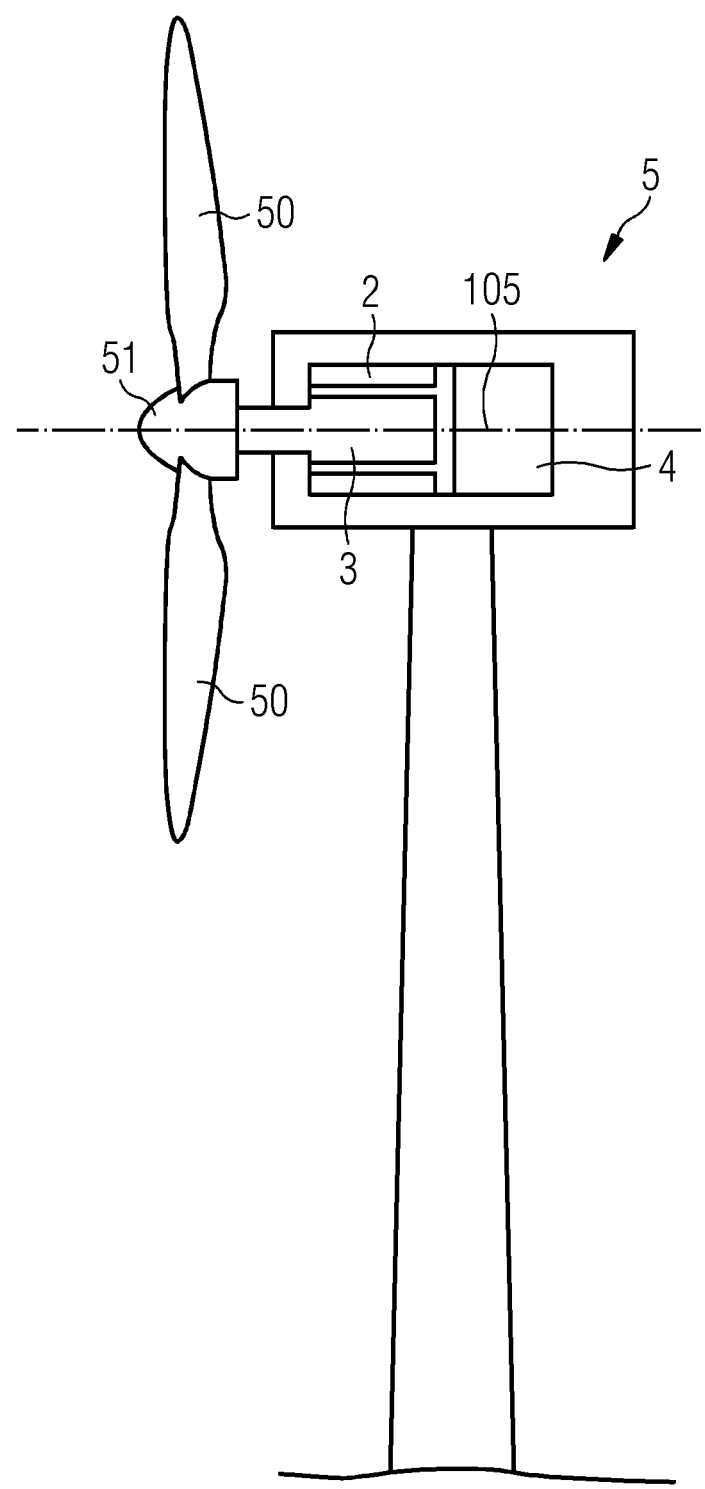

BUSBAR ARRANGEMENT FOR WIND TURBINE GENERATOR

CROSS-REFERENCE TO RELATED APPLICATIONS

This application claims priority to European Application No. 19200994.2, having a filing date of Oct. 2, 2019, the entire contents of which are hereby incorporated by reference.

FIELD OF TECHNOLOGY

The following relates to the field of wind turbine generators, in particular to a busbar arrangement for a wind turbine generator, a wind turbine generator comprising such a busbar arrangement, and a method of manufacturing a wind turbine.

BACKGROUND

In a wind turbine, the horizontal distance from the center of gravity of the blade rotor to the tower is important for the gravity load on the main structure. This means that for a wind turbine with a generator between the blade rotor and the tower, the length of the generator is important. The total length of the generator can be seen as the sum of the lengths of an active and a passive generator part, where the active generator part is formed of magnets and windings while the passive generator part is formed of support structure and electrical connections (such as busbars) for transporting the produced electrical power away from the generator, e.g. to a power converter located at ground level.

Accordingly, there may be a need for a way of maximizing the active length of magnets and windings and minimizing the passive length used for structure and electrical connections.

SUMMARY

According to a first aspect of embodiments of the invention, there is provided a busbar arrangement for a wind turbine generator, the wind turbine generator comprising a stator and a rotor arranged to rotate around an axis. The arrangement comprises a plurality of busbars for transporting electric power away from the generator, wherein each busbar is arranged at an individual radial distance from the axis and at an individual axial position along the axis.

This aspect of embodiments of the invention is based on the idea that by arranging the busbars with individual radial distances from the axis (e.g. as opposed to arranging the busbars at the same radial distance from the axis), a compact busbar arrangement can be obtained. In particular, the axial extension of the busbar arrangement (which contributes to the total length of the generator, in particular to the inactive part of the generator) can be reduced while still allowing easy access to each busbar during mounting and maintenance.

According to an embodiment of the invention, the radial distances from the axis for two neighboring busbars differ by a predetermined radial amount.

In other words, the difference in radial distance from the axis is the same (i.e. equal to the predetermined radial amount) for any two neighboring busbars in the arrangement.

According to a further embodiment of the invention, the axial positions of two neighboring busbars are separated by a predetermined axial amount.

In other words, the busbars are equally separated (by the predetermined axial amount) in the axial direction.

According to a further embodiment of the invention, the busbar located at the axial position closest to the rotor has a minimum radial distance from the axis, and the radial distance increases for axial positions with increasing axial distance from the rotor.

Thus, the busbar closest to the rotor, i.e. closest to the active part of the generator is also closest to the axis and the distance from the axis increases for each busbar in the axial direction away from the rotor, i.e. away from the active part of the generator.

According to a further embodiment of the invention, the plurality of busbars form a staircase-like structure.

According to a further embodiment of the invention, each busbar is shaped as an arc around the axis.

The busbars may extend all way or partially around the axis. Each busbar has a curvature that assures that the radial distance from the axis is the same at any position of the arc-shaped busbar.

According to a further embodiment of the invention, each busbar has a rectangular cross section.

According to a further embodiment of the invention, the longer side of the rectangular cross section extends in the radial direction relative to the axis.

Thereby, the extension of each busbar is minimal in the axial direction.

According to a further embodiment of the invention, each busbar comprises one or more coupling portions for providing electrical connections to other components of the wind turbine and/or to other busbars.

In other words, the coupling portions serve to connect the busbars with other electrical components of the wind turbine and/or to interconnect the busbars.

According to a further embodiment of the invention, the coupling portions are adapted for being coupled to electrical connectors by screws or bolts.

According to a further embodiment of the invention, the difference in radial distance from the axis and the axial separation between neighboring busbars are selected to allow accessing the coupling portions with corresponding tools.

In other words, the radial distance from the axis and the axial separation of the busbars are selected in such a way that sufficient place is available for accessing the coupling portions with the tools, in particular without interference from other busbars.

According to a second aspect of embodiments of the invention, there is provided a wind turbine comprising a generator having a stator and a rotor arranged to rotate around an axis and adapted to generate electrical power, and a busbar arrangement according to the first aspect or any of the above embodiments, the busbar arrangement being supported by the stator and coupled to the generator to transport the electrical power away from the generator.

This aspect of embodiments of the invention is based on essentially the same idea as the first aspect described above and provides a wind turbine with an optimized generator length.

According to a third aspect of embodiments of the invention, there is provided a method of manufacturing a wind turbine. The method comprises (a) providing a generator having a stator and a rotor arranged to rotate around an axis, and (b) providing a plurality of busbars for transporting electric power away from the generator, wherein each busbar is arranged at an individual radial distance from the axis and at an individual axial position along the axis.

This aspect of embodiments of the invention is based on essentially the same idea as the first and second aspects described above.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention is not limited to the described exemplary embodiments.

BRIEF DESCRIPTION

Some of the embodiments will be described in detail, with references to the following Figures, wherein like designations denote like members, wherein:

FIG. 5 shows a schematic representation of a generator in a wind turbine.

DETAILED DESCRIPTION

Figure 1:
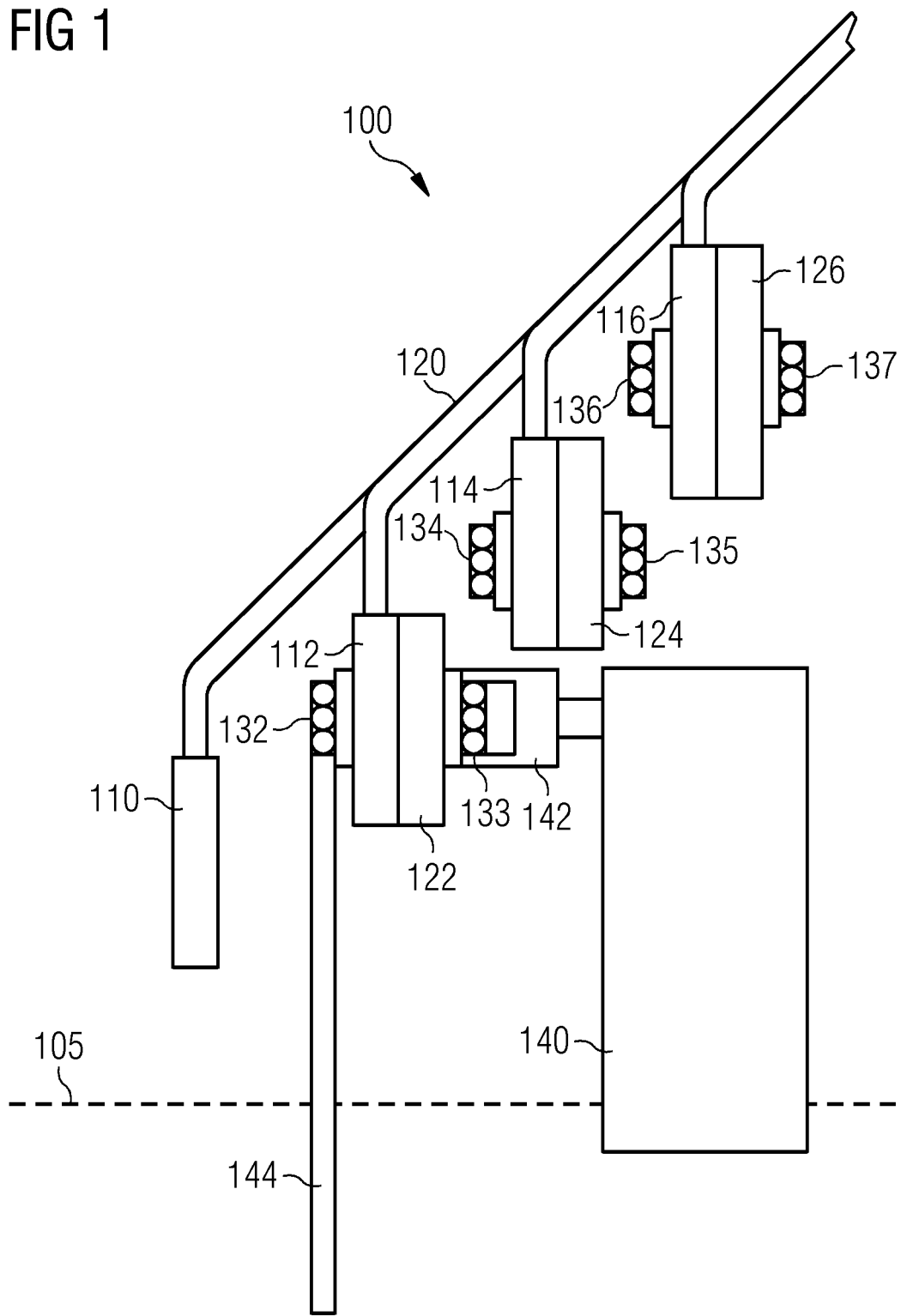
FIG. 1 shows a cross-sectional view of a busbar arrangement according to an exemplary embodiment of the invention.

The illustration in the drawing is schematic. It is noted that in different figures, similar or identical elements are provided with the same reference numerals or with reference numerals which differ only within the first digit.

FIG. 1 shows a cross-sectional view of a busbar arrangement 100 according to an exemplary embodiment of the invention. The busbar arrangement comprises busbars 110, 112, 114, 116 arranged at different positions along the axis 105 (corresponding to a wind turbine rotational axis). The busbar 110 is closest to the active part of a generator of a wind turbine (not shown), i.e. to the part of the generator that produces electric power when a rotor rotates about the axis 105 and thereby generates electrical currents in a corresponding part of a stator. The other busbars 112, 114, 116 are respectively further away from the active part of the generator (in the direction of axis 105). The busbars 110, 112, 114, 116 have rectangular cross sections with the shorter side extending in the axial direction and the longer side extending radially away from the axis 105. Each busbar 110, 112, 114, 116 is shaped like an arc at least partially surrounding the axis 105. Furthermore, the busbar 112 has a larger radial distance from the axis 105 than the busbar 110, the busbar 114 has a larger radial distance from the axis 105 than the busbar 112, and the busbar 116 has a larger radial distance from the axis 105 than the busbar 114. The busbars 110, 112, 114, 116 are supported by a correspondingly inclined support structure 120 and thus forms a staircase-like structure. Furthermore, electrical connectors 122, 124, 126 are respectively coupled to the busbars 112, 114, 116 by corresponding pairs of fastening means or, connectors, or fasteners, such as pairs of nuts and bolts 132, 133; 134, 135; and 136, 137.

FIG. 1 also shows a set of tools for coupling the electrical connector 122 to the corresponding coupling portion of busbar 112, more specifically an electric screwdriver 140 with a head 142 fitting bolt 133, and a spanner or wrench 144 fitting nut 132. It should be noted that the tools 140, 144 are not as such part of the busbar arrangement 100 but used during mounting and maintenance work to connect the busbars 110, 112, 114, 116 with the corresponding electrical connectors 122, 124, 126. As can be seen, the staircase-like arrangement of the busbars 110, 112, 114, 116 allows the busbars 110, 112, 114, 116 to be positioned much closer to each other in the axial direction while still leaving sufficient room for using the tools 140, 114 during mounting and maintenance work. If the busbars 110, 112, 114, 116 were arranged with the same radial distance from the axis 105, the busbar 114 would have to be located on the opposite side of screwdriver 140 and thus even further away from busbar 112 than the axial position of busbar 116 in FIG. 1. Accordingly, the shown busbar structure is significantly more compact than a simple horizontal arrangement which would be significantly longer in the direction of axis 105. Thereby, the busbar structure of embodiments of the present invention allows easy mounting while minimizing the passive (i.e. non-active) length of the wind turbine generator and thereby minimizing the structural load on the wind turbine tower.

Figure 2:
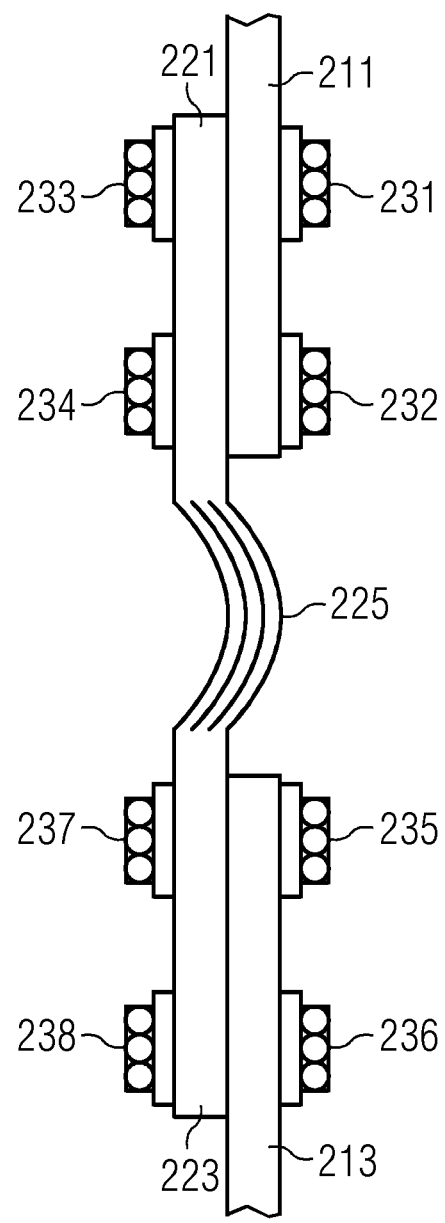
FIG. 2 shows a detailed view of two interconnected busbars according to an exemplary embodiment of the invention.

FIG. 2 shows a detailed view of two interconnected busbars 211, 213 according to an exemplary embodiment of the invention. As can be seen, the busbar 211 is coupled to electrical connector 221 by two bolts 231, 232 and two nuts 233, 234. Similarly, the busbar 213 is coupled to electrical connector 223 by two bolts 235, 236 and two nuts 237, 238. The electrical connectors 221, 223 are connected through a flex cable 225. The interconnection principle shown in FIG. 2 can be used to interconnect two busbars, as shown, but also to interconnect a busbar and a generator winding (not shown) or a busbar and an output power cable (or busbar). The connections using bolts and nuts are easy to use as long as there is enough room for the needed tools (see above). Furthermore, the connections are generally very effective and reliable.

Figure 3:
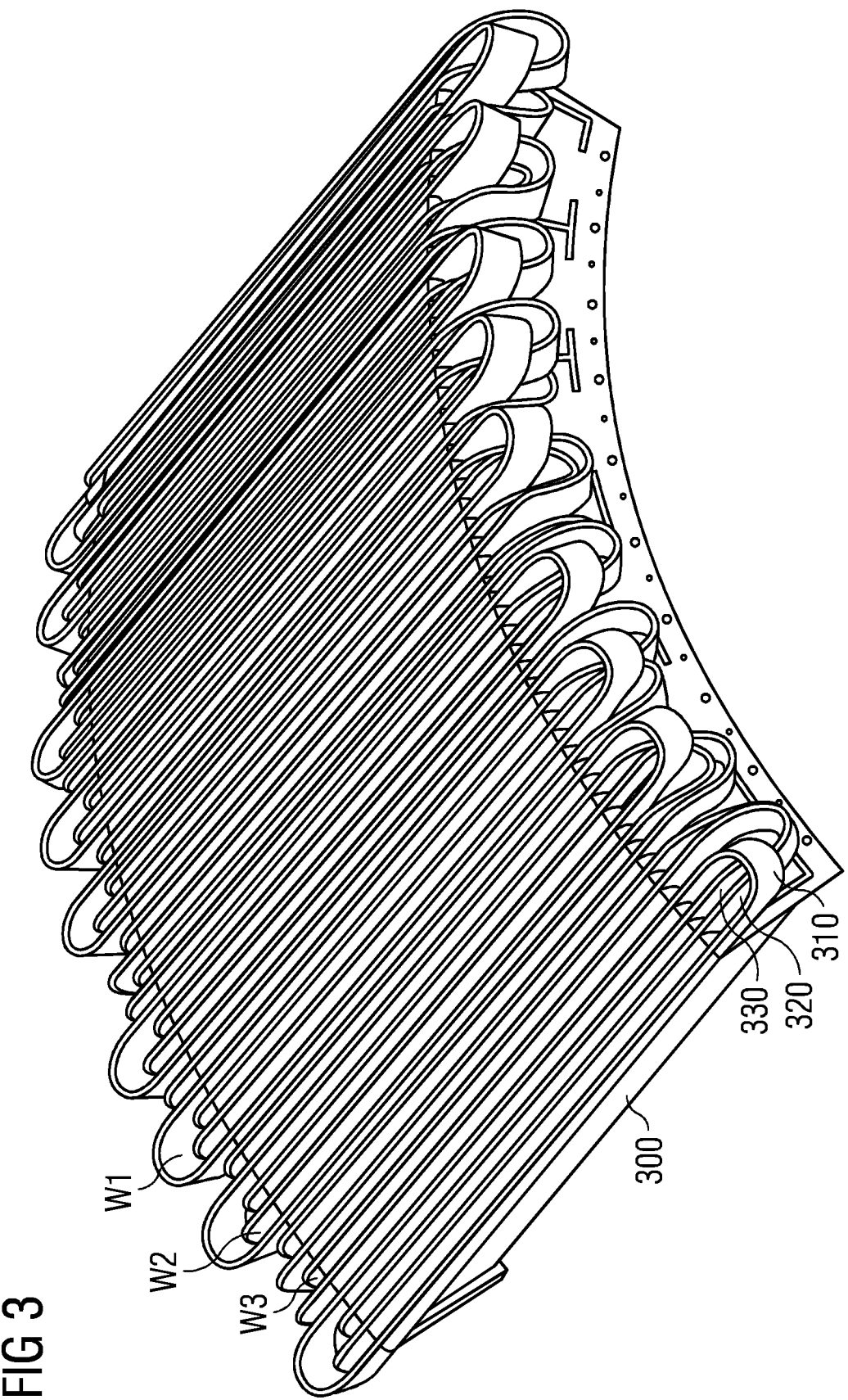
FIG. 3 shows a stator segment which may be connected to a busbar arrangement according to an exemplary embodiment of the invention.

FIG. 3 shows a segment 300 of a stator with an arrangement of windings 310, 320, 330 in a so called "distributed winding" scheme. Each winding 310, 320, 330 is shown as a metal strip folded to give a closed loop. Three distinct winding types W1, W2, W3 are shown. Each coil comprises a sequence of windings 310, 320, 330, whereby a coil sequence comprises each of the different winding types W1, W2, W3 in turn. The respective bus bar arrangements for connecting the windings 310, 320, 330 to output power electronics are shown in FIGS. 1 and 2 and discussed above.

Figure 4:
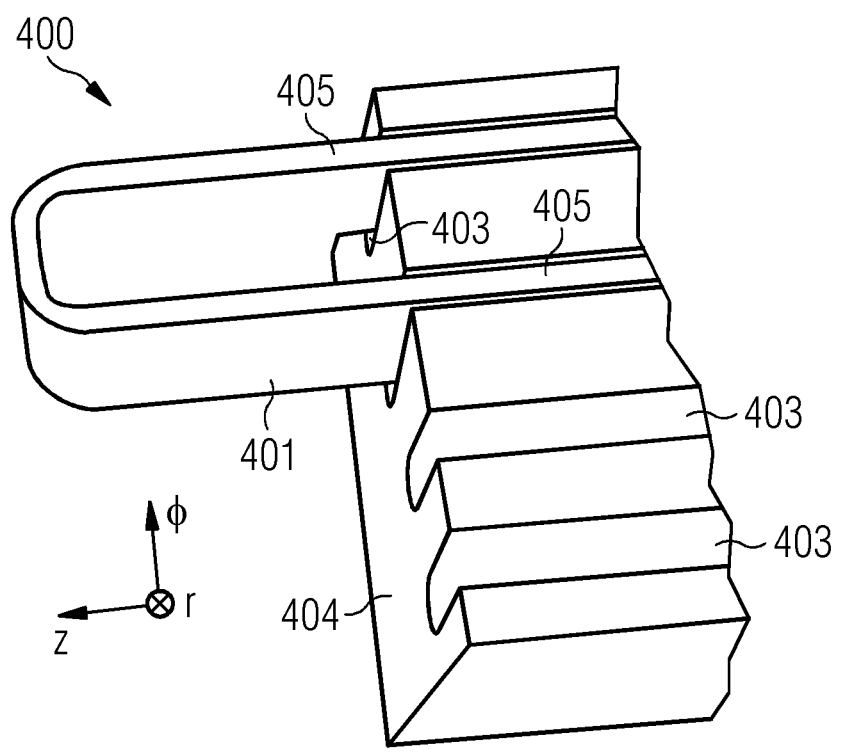
FIG. 4 shows another stator segment which may be connected to a busbar arrangement according to an exemplary embodiment of the invention.

FIG. 4 shows a segment 400 of a stator with an exemplary winding 401 in stator slots 403 of a stator lamination 404 in a so called "concentrated winding" scheme. In this configuration, two copper bars 405 of one winding 401 are located in adjacent stator slots 403. As example of the position of adjacent "concentrated" windings, two adjacent slots 403 are shown in which a winding is locatable. The respective bus bar arrangements for connecting the winding 401 to output power electronics are shown in FIGS. 1 and 2 and discussed above.

FIG. 5 shows a very simplified representation of a generator 4 in a wind turbine 5. For the sake of simplicity, only the relevant components are indicated, and other components such as a gearbox, controller, etc. are not shown. Pressure exerted on the blades 50 of the wind turbine 5 causes the hub 51 or spinner to turn, thus causing a rotor 3 to rotate. The rotor 3 is enclosed in a stator 2, about which a plurality of coils (not shown in the diagram) is wound. The generator 4 operates as an induction motor, with a current being induced in the coils. The principle of operation of such a generator will be clear to the skilled person and need not be described in detail here. Because of the large currents (for example in the region of 200-500 Amps for 2-10 MW wind turbines), the windings must be correspondingly dimensioned. For a wind turbine stator, the windings are typically made of stacked metal bars or strips with a cross-section in the region of 20 mm×100 mm. These metal strips are held in stator slots arranged around the outside of the stator, which can be up to 3 m in length. Generally, because of the large dimensions (a wind turbine stator can have a diameter in the region of 3 m to 7 m or more), the stator generally comprises a set of stator segments, e.g. configured as shown in FIGS. 3 and 4. In order to transport produced electric power from the generator 4 to power electronics, such as rectifiers and power converters (not shown), the windings of the stator 2 are connected to a compact busbar arrangement 100 as shown in FIGS. 1 and 2 and discussed above. The busbar arrangement is located on the side of the generator 4 that is opposite to the blades 50 and hub 51.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A busbar arrangement for a wind turbine generator, the wind turbine generator comprising a stator and a rotor arranged to rotate around an axis, the rotor being coupled to a hub carrying rotor blades, the arrangement comprising:
a plurality of busbars for transporting electric power away from the generator,
wherein each busbar is arranged at an individual radial distance from the axis and at an individual axial position along the axis, wherein the plurality of busbars forms a staircase-like structure and is adapted to be located on a side of the wind turbine generator that is opposite to the rotor blades and hub.

2. The arrangement according to claim 1, wherein the radial distances from the axis for two neighboring busbars differ by a predetermined radial amount.

3. The arrangement according to claim 1, wherein the axial positions of two neighboring busbars are separated by a predetermined axial amount.

4. The arrangement according to claim 1, wherein the busbar located at the axial position closest to the rotor has a minimum radial distance from the axis, and wherein the radial distance increases for axial positions with increasing axial distance from the rotor.

5. The arrangement according to claim 1, wherein each busbar is shaped as an arc around the axis.

6. The arrangement according to claim 1, wherein each busbar has a rectangular cross section.

7. The arrangement according to claim 6, wherein the longer side of the rectangular cross section extends in the radial direction relative to the axis.

8. The arrangement according to claim 1, wherein each busbar comprises one or more coupling portions for providing electrical connections to other components of the wind turbine or to other busbars.

9. The arrangement according to claim 8, wherein the coupling portions are adapted for being coupled to electrical connectors by screws or bolts.

10. The arrangement according to claim 8, wherein the difference in radial distance from the axis and the axial separation between neighboring busbars are selected to allow accessing the coupling portions with corresponding tools.

11. A wind turbine comprising:
a generator having a stator and a rotor arranged to rotate around an axis and adapted to generate electrical power, and
a busbar arrangement according to claim 1, the busbar arrangement being supported by the stator and coupled to the generator to transport the electrical power away from the generator.

12. A method of manufacturing a wind turbine, the method comprising:
providing a generator having a stator and a rotor arranged to rotate around an axis, the rotor being coupled to a hub carrying rotor blades, and
providing a plurality of busbars for transporting electric power away from the generator, wherein each busbar is arranged at an individual radial distance from the axis and at an individual axial position along the axis, and wherein the plurality of busbars forms a staircase-like structure and is adapted to be located on a side of the wind turbine generator that is opposite to the rotor blades and hub.

13. A busbar arrangement for a wind turbine generator, the wind turbine generator comprising a stator and a rotor arranged to rotate around an axis, the arrangement comprising:
a plurality of busbars for transporting electric power away from the generator, wherein each busbar is arranged at an individual radial distance from the axis and at an individual axial position along the axis, wherein each busbar has a rectangular cross section, and wherein the longer side of the rectangular cross section extends in the radial direction relative to the axis.

* * * * *